United States Patent
Jeong et al.

(10) Patent No.: US 6,690,878 B1
(45) Date of Patent: Feb. 10, 2004

(54) DIRECT ACCESSING APPARATUS AND METHOD OF DISK RECORDING AND REPRODUCING SYSTEM

(75) Inventors: Jeong-joo Jeong, Suwon (KR); Hee-wan Lee, Suwon (KR); Cheon-seong Lee, Suwon (KR); Byoung-ock Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/475,239

(22) Filed: Dec. 30, 1999

(51) Int. Cl.⁷ .................................................. H04N 5/93
(52) U.S. Cl. .................................... 386/52; 348/700
(58) Field of Search ......................... 386/1, 46, 44, 386/45, 4, 52, 125, 155; 360/13, 72.1

(56) References Cited

U.S. PATENT DOCUMENTS 4,685,003 A * 8/1987 Westland ..................... 386/52
6,137,544 A * 10/2000 Dimitrova et al. .......... 348/700
6,334,022 B1 * 12/2001 Ohba et al. .................... 386/46
6,411,771 B1 * 6/2002 Aotake .......................... 386/52
6,496,228 B1 * 12/2002 McGee et al. .............. 348/700

\* cited by examiner

*Primary Examiner*—Thai Tran
*Assistant Examiner*—Christopher Onuaku
(74) *Attorney, Agent, or Firm*—Staas & Halsey LLP

(57) ABSTRACT

A directly accessing apparatus and method of a disk recording and reproducing system, in which scene changes are detected and the very next specific images in the start portions of continuous images after the scene changes are captured, decimated and stored in a temporary storage unit, and the output of the temporary storage unit is edited and recorded on a specific recording area of a disk after a corresponding moving image is entirely recorded on the disk. Accordingly, corresponding moving images can be visually indexed so as to be directly accessed.

34 Claims, 5 Drawing Sheets

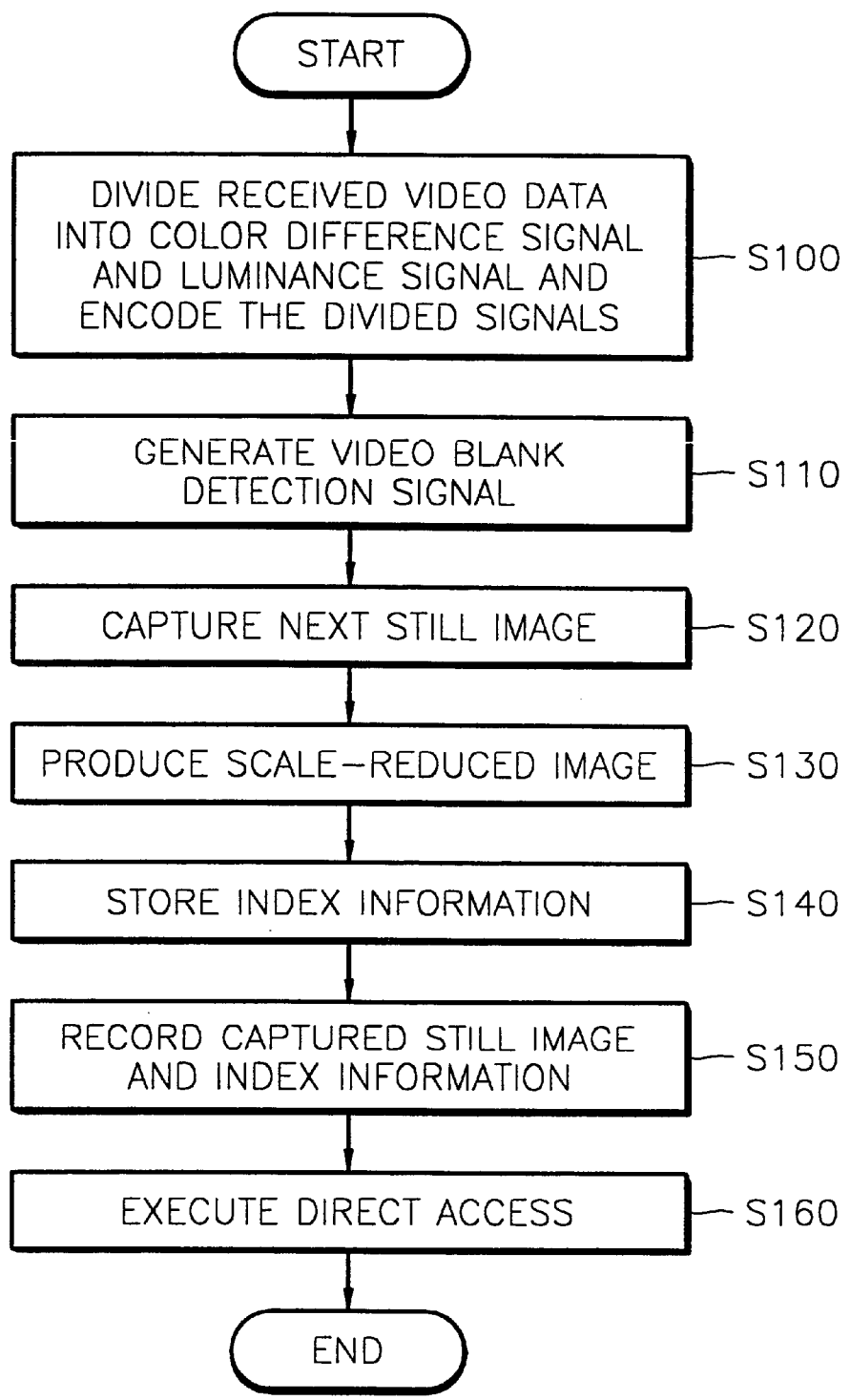

FIG. 6

| MENU SCREEN NO. | SCENE NO. | CORDINATE IN MENU SCREEN | ADDRESS OF MENU SCREEN | ADDRESSES AT WHICH IMAGES SPECIFIED BY SCENE NO. START BEING REPRODUCED |
|---|---|---|---|---|
| MENU SCREEN NO.1 | SCENE NO.1 | SCENE NO.1(X,Y) | MENU SCREEN ADDRESS NO.1 | REPRODUCTION ADDRESS NO.1 |
| | SCENE NO.2 | SCENE NO.2(X,Y) | MENU SCREEN ADDRESS NO.1 | REPRODUCTION ADDRESS NO.2 |
| | SCENE NO.3 | SCENE NO.3(X,Y) | MENU SCREEN ADDRESS NO.1 | REPRODUCTION ADDRESS NO.3 |
| | ⋮ | ⋮ | ⋮ | ⋮ |
| | ⋮ | ⋮ | ⋮ | ⋮ |
| | SCENE NO.k−1 | SCENE NO.k−1(X,Y) | MENU SCREEN ADDRESS NO.1 | REPRODUCTION ADDRESS NO.k−1 |
| | SCENE NO.k | SCENE NO.k(X,Y) | MENU SCREEN ADDRESS NO.1 | REPRODUCTION ADDRESS NO.k |
| MENU SCREEN NO.2 | SCENE NO.1 | SCENE NO.1(X,Y) | MENU SCREEN ADDRESS NO.2 | REPRODUCTION ADDRESS NO.1+k |
| | SCENE NO.2 | SCENE NO.2(X,Y) | MENU SCREEN ADDRESS NO.2 | REPRODUCTION ADDRESS NO.2+k |
| | ⋮ | ⋮ | ⋮ | ⋮ |
| | SCENE NO.k | SCENE NO.k(X,Y) | MENU SCREEN ADDRESS NO.2 | REPRODUCTION ADDRESS NO.2k |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| MENU SCREEN NO.j | SCENE NO.1 | SCENE NO.1(X,Y) | MENU SCREEN ADDRESS NO.j | REPRODUCTION ADDRESS NO.1+(j−1)k |
| | ⋮ | ⋮ | ⋮ | ⋮ |
| | ⋮ | ⋮ | ⋮ | ⋮ |
| | ⋮ | ⋮ | ⋮ | ⋮ |
| | SCENE NO.k | SCENE NO.k(X,Y) | MENU SCREEN ADDRESS NO.j | REPRODUCTION ADDRESS NO.jk |

DIRECT ACCESSING APPARATUS AND METHOD OF DISK RECORDING AND REPRODUCING SYSTEM

BACKGROUND OF THE INVENTION

1. Field of the Invention

The present invention relates to a direct accessing apparatus and method of a disk recording and reproducing system, and more particularly, to a direct access apparatus in a disk recording and reproducing system, in which a specific image corresponding to the start portion of a continuous image is captured from the continuous image, and the specific image is then recorded on a specific recording area of a disk together with index image information corresponding to the specific image, so that the position of a corresponding moving image can be directly accessed using index image information in a reproduction mode, and to a direct access method thereof.

2. Description of the Related Art

Generally, recorded information can be reproduced using magnetism or using light. In the recorded information reproducing method using magnetism, the alignment of the polarities of magnetic materials coated on a magnetic medium is detected, and information is reproduced according to a corresponding polarity (or phase). As described above, the alignment of the polarities of magnetic materials is used in this recording method. In this sense, this recording method has a merit in that information can be freely recorded.

In the recorded information reproducing method using light, light is projected onto the recorded surface of a recording medium, and irregular reflection caused by pits manufactured on a recording medium is detected, thereby reproducing information. As described above, pits are fabricated on the recording medium in this method. In this sense, this method has a very excellent information retaining efficiency.

Storage media using light include a compact disk-read only memory (CD-ROM) and a dynamic versatile disk-read only memory (DVD-ROM). CD-ROMs store a great amount of information; about 700 megabytes (Mbytes) per information recording layer.

A typical storage medium includes a plurality of sectors radially partitioned on a storage medium having a circular plate shape, and a plurality of tracks into which the sectors are equally and concentrically divided. A storage medium rotates at about 7200 rpm on average, and a disk reproducing apparatus reproduces information in the shape of a concentric circle in a direction from the center of the storage medium to the outer diameter thereof.

Accordingly, a disk reproducing apparatus must be able to rapidly detect specific information among a great amount of information stored in a storage medium. Recent disk reproducing apparatuses must search for information quickly with a trend toward the acceleration of research into high-speed reproduction of a storage medium.

In particular, there is a recent trend toward generalization of not only CD_ROM drives for simply reproducing a recording medium but also compact disk-recordable (CD-R) drives capable of once recording or compact disk-rewritable (CD_RW) drives which are disk recording and reproducing systems capable of several recordings and reproductions. Hence, many recording apparatuses and methods are well-known in which direct access is provided during recording of data on a disk in order to allow users to directly access the position of a desired recorded image upon reproduction of the disk.

As shown in FIG. 1, in a general disk recording and reproducing system, when a data recording command is applied, a data recoding mode is set up, and as video data and audio data are applied, a video encoder 100 and an audio encoder 101 encode the video data and the audio data, respectively. Then, a data mixer 102 mixes the encoded video data and the encoded audio data. The mixed data is channel-encoded by a channel encoder 103. In the channel encoder 103, an address on a disk 109 is applied to the mixed data, a parity for data scrambling and error detection is also applied thereto, and the mixed data is finally 8-to-16-modulated and output. A data storage unit 110 is required to perform the channel encoding. A technique associated with the above-described channel encoding departs from the core of the present invention, so a detailed description thereof is found in Korean Patent Application No. 96-69200.

A data bitstream output from the channel encoder 103 is modulated by a laser power modulator 104 before it is recorded on the disk 109. As a recording/reproducing switch 130 is switched to a recording mode, the output of the laser power modulator 104 is recorded in the disk 109 by an optical pickup 105. The focusing/tracking of the optical pickup 105 is controlled by a focusing/tracking servo unit 106. The optical disk 109 is rotated by a spindle motor 108 under the control of a spindle servo unit 107.

Data reproduction is performed by reversing the order of steps used in data recording. When a data reproduction command is applied, the recording/reproducing switch 130 is switched to a reproduction mode. Thus, a radio frequency (RF) amplifier 111 amplifies a weak, read signal detected by the optical pickup 105, to an appropriate gain. A channel decoder 112 performs error detection and error correction on the basis of the preset reverse process of channel encoding, and performs 8-to-16 demodulation.

Thereafter, a data parser 113 parses the output of the channel decoder 112 into video data and audio data. A video decoder 114 and an audio decoder 115 decode the video data and the audio data, respectively.

Accordingly, a television (TV) signal encoder 116 encodes the output of the video decoder 114 into a TV image signal of a standard such as NTSC, PAL or SECAM, and displays a video signal via a monitor 118. Simultaneously, a digital-to-analog converter (DAC) 17 converts the output of the audio decoder 115 into an analog audio signal and outputs the analog audio signal via a speaker 119.

In such a conventional disk recording and reproducing system, when a moving picture such as a movie or TV program is consecutively recorded using an optical disk recording apparatus, users cannot directly access a specific portion of the recorded moving picture.

SUMMARY OF THE INVENTION

To solve the above and other problems, an object of the present invention is to provide a direct accessing apparatus and method in a disk recording and reproducing system, in which a specific image is periodically captured from an input video signal consisting of a sequence of specific images which when suitably displayed give the appearance of a moving or continuous image, each captured image is edited with information including information on the positions of areas of a disk on which the specific images are recorded, and a resultant image (the image index information) is recorded on a specific area of the disk. The image index information is utilized as visual index information in a reproduction mode, so that users can directly access the position of a desired moving image.

Additional objects and advantages of the invention will be set forth in part in the description which follows, and, in part, will be obvious from the description, or may be learned by practice of the invention.

Accordingly, to achieve the above and other objects, the present invention provides a direct accessing apparatus in a disk recording and reproducing system, including a video encoder, an image capturer, a microprocessor and an index image storage unit. The video encoder receives and encodes video data consisting of a sequence of specific images as a data recording command is applied. The image capturer periodically captures video data corresponding to a specific or still image from the encoded video data. The microprocessor records the encoded video data on the disk as a continuous image consisting of a sequence of specific images, receives and edits the outputs of the image capturer in units of a screen, generates image index information including information on the positions of areas of a disk on which each specific image corresponding to a captured image is recorded in the continuous images, records the captured images and the image index information on a specific area of the disk, in a recording mode, and directly accesses the continuous image beginning at the position on the disk where a specific image corresponds to a captured image. The index image storage unit stores the captured images and the image index information.

To achieve the above objective, the present invention provides a direct accessing method of a disk recording and reproducing system, comprising the steps of: (a) receiving and encoding video data as a data recording command is applied; (b) capturing still images from the encoded video data at predetermined time intervals; (c) receiving and editing the captured still images in units of a screen to enable a continuous image including the still images to be visually indexed, and storing image index information including information on the positions of areas of a disk on which the still images are recorded, by matching the image index information with the still images; (d) editing and recording the image index information on a specific area of the disk, after all of the video data on the disk is completely recorded; and (e) determining the addresses from which the continuous image is to be reproduced from the disk, by reading the still images recorded on the disk, and directly accessing the continuous image at an address corresponding to the read still images, in a video reproduction mode.

BRIEF DESCRIPTION OF THE DRAWINGS

The above objective and advantages of the present invention will become more apparent by describing in detail preferred embodiments thereof with reference to the attached drawings in which:

FIG. 5 is a flowchart illustrating a direct accessing method of a disk recording and reproducing system according to the present invention; and FIG. 6 shows the hierarchical structure of image index information proposed by the present invention.

DESCRIPTION OF THE PREFERRED EMBODIMENTS

Figure 1:
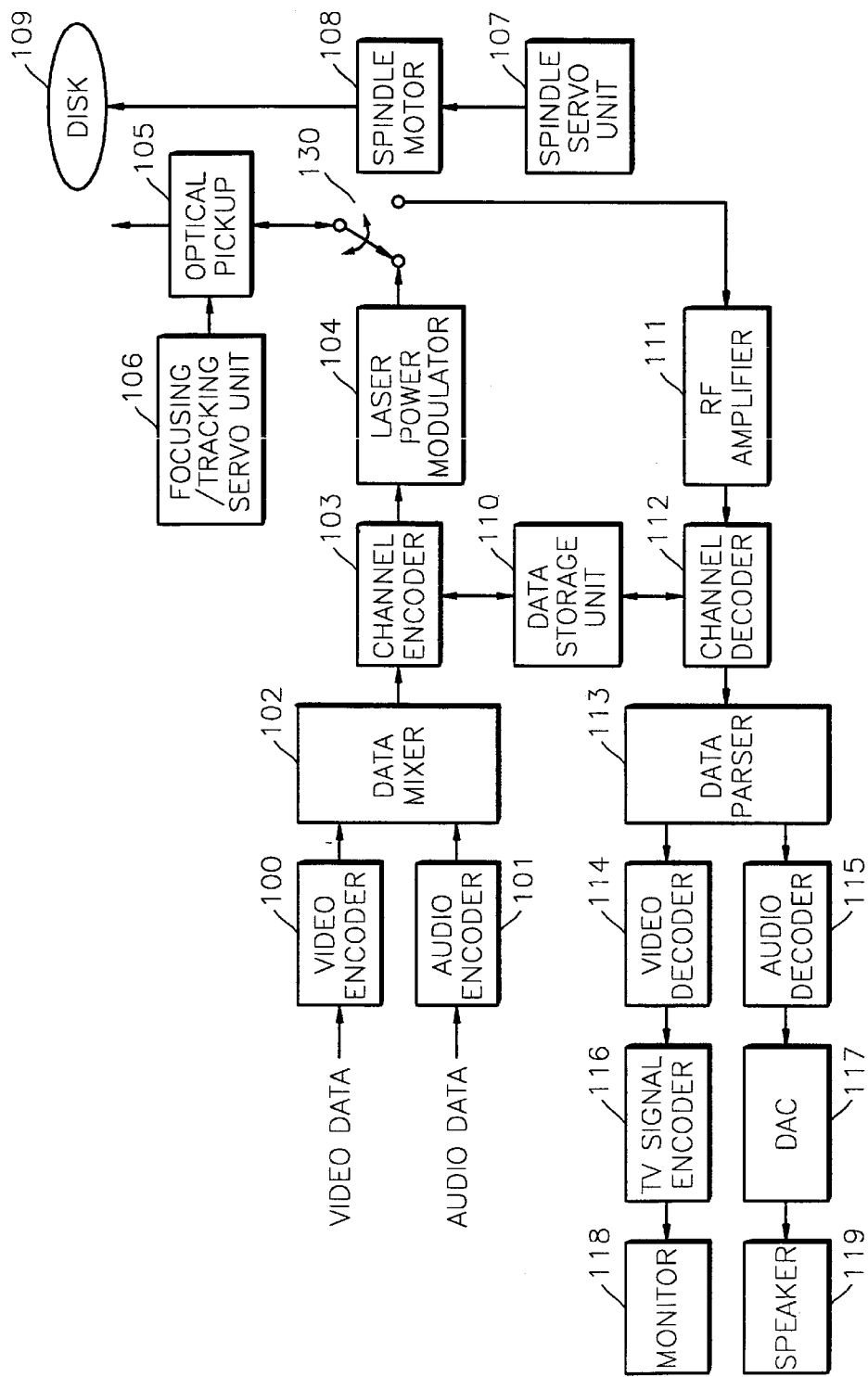
FIG. 1 is a block diagram of a conventional disk recording and reproducing system.

Reference will now be made in detail to the present preferred embodiments of the present invention, examples of which are illustrated in the accompanying drawings, wherein like reference numerals refer to like elements throughout.

Figure 2:
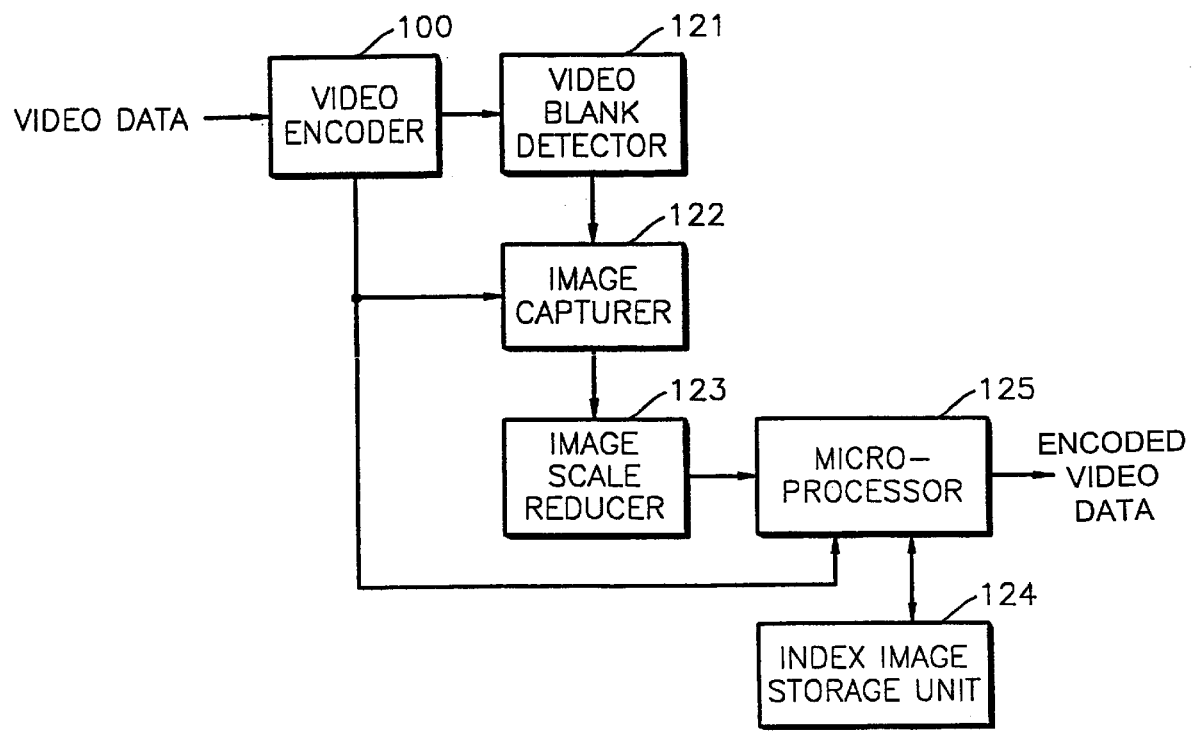
FIG. 2 is a block diagram of a direct accessing apparatus in a disk recording and reproducing system according to a first embodiment of the present invention.

A first embodiment of a direct access apparatus in a disk recording and reproduction system will now be described with reference to FIG. 2. Components of FIG. 2 that are similar to those of the conventional disk recording and reproducing system shown in FIG. 1, are provided with the same reference numerals as those of FIG. 1. As shown in FIG. 2, a direct accessing apparatus in a disk recording and reproducing system according to the first embodiment of the present invention includes a video encoder 100, a video blank detector 121, an image capturer 122, an image scale reducer 123, an index image storage unit 124, and a microprocessor 125.

Generally, when a scene of a continuous picture such as a movie changes, it is faded out, a video blank appears for a short time, and the next scene is then faded in. In the present invention, a video blank is detected, and thus the start screen of a new scene is captured and utilized as a directly-accessible image upon reproduction.

First, the video encoder 100 receives video data, divides the same into a color difference signal and a luminance signal, and encodes the divided signals, as a data recording command is applied. Then, the video blank detector 121 inspects the level of the luminance signal, and periodically detects a video blank section at predetermined time intervals, thus generating a video blank detection signal.

As the video blank detection signal is applied, the image capturer 122 captures the very next still image after the detected video blank section, from the output signal of the video encoder 100. Then, the image scale reducer 123 decimates the still image signal captured by the image capturer 122, in a predetermined ratio.

The microprocessor 125 receives the output of the image scale reducer 123 to allow visual indexing with respect to a continuous image including the captured still image, edits each decimated image in screen units of one frame, and stores image index information including position information on an area of a disk on which the captured still image is recorded, in the index image storage unit 124, by matching the image index information with each decimated image.

For example, in order to allow a movie to be directly accessed in units of 10 minutes, after a reproduction time of 10 minutes passes, a still image is immediately captured. Then, the image scale reducer 123 receives the captured still image, performs down-sampling or decimation filtering on the received still image, and generates a decimated image.

The setting of an appropriate time such as the unit of 10 minutes prevents generation of an excessive number of access units. Also, the decimation of the captured still image using the image scale reducer 123 is to facilitate visual editing with respect to large images by performing decimation filtering or simple sub-sampling on the large original image of the captured still image.

For example, an original image of 720 pixels×480 pixels is decimated in a ratio of 10 to 1, and becomes an image of 72 pixels×48 pixels, thereby reducing the spacial resolution.

Figure 3:
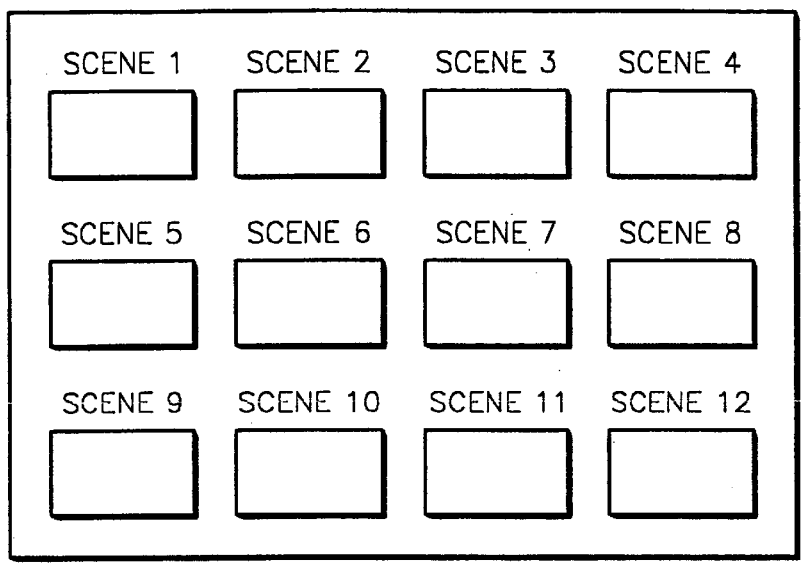
FIG. 3 shows an example of decimated images recorded in an index image storage unit on a screen-by-screen basis.

The edited form of the decimated images recorded on a screen-by-screen basis, is shown in FIG. 3.

As described above, the decimated images which are edited on a frame-by-frame basis and stored in the index image storage unit 124 are stored in a specific area of a disk, so that they can be utilized as visual indexing means for direct accessing.

Meanwhile, image index information to be recorded on a specific area of the disk 109 is written in a hierarchical structure as shown in FIG. 6. When image index information is written, first, each menu screen formed by editing decimated images in units of a screen is numbered, and each of the decimated pictures is provided with a scene number. As shown in FIG. 6, each menu screen includes k scenes, and each of the scenes is set to have a unique screen coordinate within a menu screen. Position information on an area of a disk on which each menu screen is recorded, that is, a storage address, is matched with each menu screen. To be more specific, addresses at which a continuous image including still images specified by scene numbers is to be reproduced, are matched with the scene numbers for the decimated images.

Under the control of the microprocessor 125, all encoded video data is recorded on the disk, and then image data and image index information stored in the index image storage unit 124 are recorded on a specific recording area of the disk also as encoded video data. A recording signal processor (not shown) which includes a channel encoder and a laser power modulator assists the microprocessor in recording the encoded video data on the disk. Accordingly, in a subsequent reproduction mode, a decimated image, recorded on a specific area of the disk, is selected by a user, the position information on an area of the disk on which the selected decimated image has been recorded is read, and an address from which the selected decimated image is to be reproduced is designated. In this way, a continuous image following the selected decimated image can be directly accessed.

Figure 4:
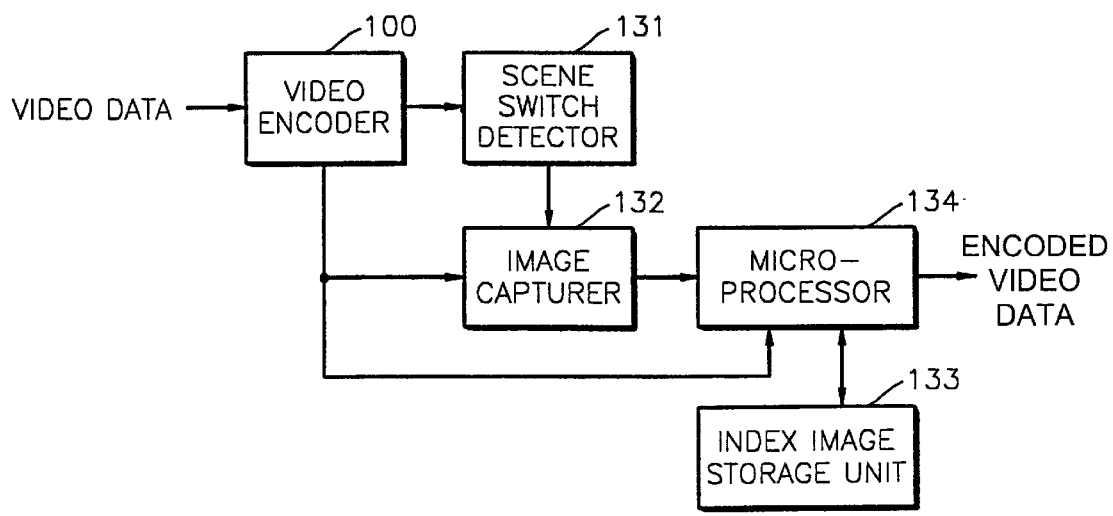
FIG. 4 is a block diagram a direct accessing apparatus in a disk recording and reproducing system according to a second embodiment of the present invention.

A second embodiment of a direct access apparatus in a disk recording and reproducing system according to the present invention will now be described with reference to FIG. 4. As shown in FIG. 4, the direct accessing apparatus according to the second embodiment of the present invention includes a video encoder 100, a scene switch detector 131, an image capturer 132, an index image storage unit 133 and a microprocessor 134.

As described above, when a scene of a continuous picture such as a movie is switched, it is faded out, a video blank appears for a short time, and the next scene is then faded in. However, in some cases, the detection of a video blank section using such a feature may not be sufficient to effectively index each continuous image. For example, as in the case of a picture for relaying a sports game, when photographing is performed at various shooting angles, or when various image screens are intentionally edited, screens can be switched without screen effects such as fading in or fading out.

A process for effectively generating and recording image index information will now be described. Video encoder 100 receives and encodes video data as a data recording command is applied. Then, the scene switch detector 131 periodically detects scene switching spots from the encoded video data at predetermined time intervals and generates a scene switch detection signal. Here, many methods of detecting scene switching spots are well-known, among which the most general method is that differential information between screen frames is calculated, and when the calculated differential information exceeds a predetermined reference value, a scene is determined to have switched between two screen frames.

Next, the image capturer 132 captures the very next still image from the output of the video encoder 100 immediately after a scene switching spot is detected, as the scene switch detection signal is applied. Following this, the microprocessor 134 stores image index information including information on the position of an area of a disk on which the adjacent still image is recorded, in the index image storage unit 133, by matching with the captured still images.

Here, in order to facilitate visual observation of image index information, the still images can be decimated and collected in units of a menu screen. However, in application fields requiring high-resolution index images, it may be preferable that image decimation is not be performed. Undoubtedly, the captured still images can be decimated to write image index information, as described in the first preferred embodiment of the present invention.

Finally, the microprocessor 134 records all of the video data of the video encoder 100 on the disk, and edits and records the still images and image index information stored in the index image storage unit 133, on a specific recording area of the disk. Thus, the still images recorded on the specific recording area of the disk are read and designated in a reproduction mode, making it possible that continuous images corresponding to the still images are directly accessed.

A preferred embodiment of a direct accessing method of a disk recording and reproducing system according to the present invention will now be described with reference with FIG. 5. First, as a data recording command is applied, video data is received, divided into a color difference signal and a luminance signal, and encoded, in step S100.

Then, the level of the luminance signal is determined, a video blank section is detected at predetermined time intervals, and a video blank detection signal is thus generated, in step S110.

As the video blank detection signal is applied, the very next still image after the detected video blank section is captured, in step S120. Decimated images are produced by decimating the captured still image in a predetermined decimation ratio, in step S130.

Next, in order for a continuous image including the captured still images to be visually indexed, the decimated images are edited in units of a screen, and image index information including position information on areas of a disk on which the captured still images are recorded is then stored, matching to the decimated images, in step S140.

Thereafter, all of the encoded video data is recorded on the disk, and the captured still images and image index information are then edited and stored on a specific recording area of the disk, in step S150.

Following this, in a video reproduction mode, the decimated images recorded on the disk are read, addresses from which the disk can be reproduced are thus determined, and continuous images corresponding to the specified decimated images are thus directly accessed, in step S160.

As described above, specific images are periodically captured from a received video signal, the captured images are edited with image index information including position information on an area of a disk on which the specific image is recorded, and the edited information is recorded on a specific area of the disk. Therefore, the image index information is utilized as visual index information in a reproduction mode, enabling users to directly access the location of a desired moving image.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A direct accessing apparatus for a disk recording and reproducing system, comprising:
   a video encoder which receives and encodes video data as a data recording command is applied;
   an image capturer which captures video data corresponding to still images from the encoded video data at predetermined time intervals;
   a microprocessor which receives and edits the captured still image video data in units of a screen, generates image index information including information on positions of areas of the disk on which the still images are recorded, records the captured still images and the image index information on a specific area of the disk, in a recording mode, and directly accesses the continuous image corresponding to the captured still images using the image index information in a reproduction mode; and
   an index image storage unit which stores the captured still images and the index image information.

2. The direct accessing apparatus as claimed in claim 1, wherein the video encoder receives the video data, divides the video data into a color difference signal and a luminance signal, and encodes the divided signals.

3. The direct accessing apparatus as claimed in claim 2, wherein the image capturer further comprises a video blank detector which inspects the level of the luminance signal, detects a video blank section from the inspected luminance signal level, and generates a video blank detection signal.

4. The direct accessing apparatus as claimed in claim 1, wherein the image capturer comprises a scene switch detector which detects a scene switch spot from the encoded video data at the predetermined time intervals and generates a scene switch detection signal.

5. The direct accessing apparatus as claimed in claim 1, wherein the image capturer further comprises an image scale reducer which decimates the still images in a predetermined decimation ratio to generate decimated images.

6. The direct accessing apparatus as claimed in claim 5, wherein the image index information includes menu screen numbers each formed by editing the decimated images and organizing the resultant images in units of a screen, scene numbers for the decimated images, information on positions of areas of the disk on which the menu screen numbers are recorded, and addresses at which the continuous image including adjacent still images indicated by the scene numbers is to be reproduced.

7. A direct accessing method for a disk recording and reproducing system using a disk, comprising:
   (a) receiving and encoding video data as a data recording command is applied;
   (b) capturing still images from the encoded video data at predetermined time intervals;
   (c) receiving and editing the still images in units of a screen to enable a continuous image including the still images to be visually indexed, and storing image index information including information on the positions of areas of the disk on which the still images are recorded, by matching the image index information with the still images;
   (d) editing and recording the image index information on a specific area of the disk, after all of the video data on the disk is completely recorded; and
   (e) determining the addresses from which the disk is to be reproduced, by reading the still images recorded on the disk, and directly accessing the continuous image corresponding to the read still images, in a video reproduction mode.

8. The direct accessing method for a disk system as claimed in claim 7, wherein the step (a) comprises dividing the video data into a color difference signal and a luminance signal, and encoding the divided color difference and luminance signals.

9. The direct accessing method for a disk system as claimed in claim 8, wherein the step (b) comprises inspecting a level of the luminance signal, detecting a video blank section from the inspected luminance signal at the predetermined time intervals, and in response generating a video blank detection signal.

10. The direct accessing method for a disk system as claimed in claim 7, wherein the step (b) comprises detecting scene switching spots from the encoded video data at the predetermined time intervals and generating a scene switch detection signal.

11. The direct accessing method for a disk system as claimed in claim 7, wherein the step (b) comprises decimating the still images in a predetermined decimation ratio to generate decimated images.

12. The direct accessing method for a disk system as claimed in claim 11, wherein the image index information comprises menu screen numbers each formed by editing the decimated images and organizing the resultant images in units of a screen, scene numbers for the decimated images, information on a position of an area of the disk on which each of the menu screen numbers is recorded, and addresses at which a continuous image including the still images indicated by the screen numbers starts being reproduced.

13. A direct accessing apparatus for a video disk system which uses a disk, comprising:
   a video encoder which receives and encodes video data consisting of a sequence of specific images;
   an image capturer which periodically captures video data corresponding to specific images included in the encoded video data; and
   a microprocessor which receives and records the encoded video data on the disk, edits the captured video data, generates image index information including information on positions of areas of the disk on which the specific images are recorded, and records the captured images and the image index information on a specific area of a disk.

14. The direct accessing apparatus for a video disk system as claimed in claim 13, further comprising an index image storage unit for temporarily storing the captured images and the image index information.

15. The direct accessing apparatus for a video disk system as claimed in claim 13, wherein the microprocessor receives and edits the outputs of the image capturer in units of a screen.

16. The direct accessing apparatus for a video disk system as claimed in claim 13, wherein the microprocessor further comprises a reproduction mode for directly accessing continuous images corresponding to the captured images using information from the image index information.

17. The direct accessing apparatus for a video disk system as claimed in claim 13, wherein the image capturer captures images at predetermined times.

18. The direct accessing apparatus for a video disk system as claimed in claim 13, wherein the video encoder is responsive to a data recording command.

19. The direct accessing apparatus for a video disk system as claimed in claim 13, wherein the video encoder receives the video data, divides the video data into a color difference signal and a luminance signal, and encodes the divided color difference and luminance signals.

20. The direct accessing apparatus for a video disk system as claimed in claim 19, wherein the image capturer comprises a video blank detector for inspecting the level of the luminance signal, detecting a video blank section from the inspected luminance signal, and generating a video blank detection signal.

21. The direct accessing apparatus for a video disk system as claimed in claim 20 wherein the image capturer is operative at predetermined time intervals.

22. The direct accessing apparatus for a video disk system as claimed in claim 13, wherein the image capturer comprises a scene switch detector for detecting a scene switch spot from the encoded video data and generating a scene switch detection signal.

23. The direct accessing apparatus for a video disk system as claimed in claim 22 wherein the scene switch detector is operative at predetermined time intervals.

24. The direct accessing apparatus for a video disk system as claimed in claim 13, wherein the image capturer further comprises an image scale reducer for decimating the captured images in a predetermined decimation ratio to generate decimated images.

25. The direct accessing apparatus for a video disk system as claimed in claim 24, wherein the image index information includes menu screen numbers corresponding to the decimated images, scene numbers for the decimated images, information on the positions of areas of the disk on which the menu screen numbers are recorded, and addresses at which the continuous images including adjacent specific images indicated by the scene numbers are recorded on the disk.

26. The direct accessing apparatus for a video disk system as claimed in claim 24, wherein the microprocessor further generates index images, each index image comprising at least one captured image edited with image index information.

27. A direct accessing method for a video disk system, comprising:
  (a) receiving and encoding video data;
  (b) capturing specific images from the encoded video data at predetermined time intervals;
  (c) receiving and editing the captured images in units of a screen to enable a continuous image including the specific images to be visually indexed, and storing image index information including information on the positions of areas of a disk on which the specific images are recorded, by matching the image index information with the specific images; and
  (d) editing and recording the image index information on a specific area of the disk.

28. The direct accessing method for a video disk system as claimed in claim 27 wherein the image index information is recorded after all of the video data on the disk is completely recorded.

29. The direct accessing method for a video disk system as claimed in claim 28, wherein the step (a) further comprises dividing: the received video data into a color difference signal and a luminance signal, and encoding each of the divided signals.

30. The direct accessing method for a disk as claimed in claim 27, wherein the step (b) further comprises detecting scene switching spots from the encoded video data at the predetermined time intervals and generating a scene switch detection signal.

31. The direct accessing method for a disk as claimed in claim 27, wherein the step (a) further comprises dividing the received video data into a color difference signal and a luminance signal, and encoding each of the divided signals and the step (b) further comprises inspecting the level of the luminance signal, detecting a video blank section from the inspected luminance signal after the predetermined time intervals, and generating a video blank detection signal.

32. The direct accessing method for a disk as claimed in claim 27, wherein the step (b) further comprises decimating the captured images in a predetermined decimation ratio to generate decimated images.

33. The direct accessing method for a disk as claimed in claim 27, further comprising forming menu screen numbers by editing the decimated images and organizing the resultant decimated images in units of a screen, assigning scene numbers for each of the decimated images, identifying the position of an area of the disk on which each of the menu screen numbers is recorded and the address at which each segment of a continuous image including the still images indicated by the screen numbers starts.

34. A direct accessing method for reproducing a continuous image from a disk, wherein the disk includes a recording of encoded video data representing a continuous image and at least one screen having a plurality of decimated still images and associated image index information captured from the encoded video data at predetermined intervals, the image index information organized to relate each still image with an address of a segment of the continuous image containing the still image, the direct accessing method comprising:
  providing a visual menu display of the at least one screen having the plurality of decimated still images captured from the encoded video data at predetermined intervals;
  selecting one of the still images from the visual menu display; and
  accessing and reproducing the continuous image beginning at an address identified in the image index information as corresponding to the selected still image.

* * * * *

UNITED STATES PATENT AND TRADEMARK OFFICE
CERTIFICATE OF CORRECTION

PATENT NO. : 6,690,878 B1
DATED : February 10, 2004
INVENTOR(S) : Jeong-joo Jeong et al.

It is certified that error appears in the above-identified patent and that said Letters Patent is hereby corrected as shown below:

Column 10,
Line 9, delete ":";
Line 57, delete "as".

Signed and Sealed this

Twenty-second Day of June, 2004

JON W. DUDAS
*Acting Director of the United States Patent and Trademark Office*